Patented Mar. 7, 1933

1,900,392

UNITED STATES PATENT OFFICE

HORACE E. STUMP, OF LAKEVILLE, CONNECTICUT, ASSIGNOR TO NEW ENGLAND LIME CO., OF PITTSFIELD, MASSACHUSETTS, A CORPORATION OF DELAWARE

PROCESS OF OBTAINING MAGNESIUM SULPHATE

No Drawing.   Application filed June 16, 1931. Serial No. 544,921.

My invention relates to obtaining magnesium compounds from magnesium oxide in admixture with a calcium compound, especially as this substance is found in a burned mixture of magnesium carbonate and calcium carbonate, produced, for instance, from the mineral dolomite.

Dolomite consists in the main of an extremely intimate mixture of magnesium carbonate and calcium carbonate. When this substance is burned in the ordinary process of manufacturing quicklime, for instance by the ordinary lime kiln process, the magnesium carbonate is converted into magnesium oxide and carbonic acid gas and some, but usually not all, of the calcium carbonate is converted into calcium oxide and carbonic acid gas. When large blocks of dolomite are burned in the ordinary kiln there usually remains at the end of the process what is known as a "core", i. e. a mass of incompletely burned stone in the center of each block consisting mainly of magnesium oxide and calcium carbonate in such intimate admixture that these ingredients cannot readily be separated. This "core" therefore forms an extremely inexpensive source of magnesium, or more particularly of magnesium oxide, but so far as I am aware this material is usually discarded because no commercial use has as yet been found for it.

I have found that when I crush this material to finely powdered form and then treat it with sulphur dioxide and oxygen (air), I obtain magnesium sulphate. Water must be present in order to enable the reaction to take place (in any event, at any commercial rate of speed) and I prefer to mix the magnesium oxide with a great deal of water to form a slurry and then to pass the gases through such mixture, preferably while stirring the latter, thus obtaining the magnesium sulphate in the form of Epsom salts $(MgSO_4 \cdot 6H_2O)$.

I prefer to use cold water saturated with magnesium sulphate at the beginning of the reaction and then to heat the water, for instance approximately up to its boiling point, during the progress of the reaction, thus enabling the water to take into solution the magnesium sulphate formed by the reaction. The hot solution is then drawn off at the end of the reaction so as to separate the magnesium sulphate from the calcium carbonate, and as the solution is allowed to cool the magnesium sulphate crystallizes out. The cold saturated solution remaining is then ready to be used over again for the next batch of material to be subjected to the reaction. I start with a saturated solution instead of with ordinary cold water because the presence of the large amount of calcium carbonate necessitates the use of a comparatively large amount of water, and too little magnesium sulphate is formed in a single batch reaction to make it possible to recover the magnesium sulphate without boiling away the water unless I started with a saturated solution. Of course, I could start a batch with water containing no magnesium sulphate in solution and then by using the same water for a series of batch reactions gradually build up a saturated solution but eventually, of course, I should then be starting the reaction with a saturated solution.

The usual purpose of burning dolomite is to produce quicklime (CaO), and the magnesium oxide is left in admixture with the quicklime. If I should desire to obtain from a given quantity of dolomite all, or as much as reasonably possible, of the magnesium in the form of magnesium sulphate (i. e. not to obtain quicklime as the commercial product) I should proceed in one of the following ways:

1. Convert the dolomite into calcium oxide, magnesium oxide, and "core" material as above described and convert the latter into magnesium sulphate, as above described, form a suspension of the magnesium oxide and calcium oxide in water, thus incidentally slaking the calcium oxide, pass $CO_2$ (waste product of dolomite burning) into the suspension, thus converting the calcium hydrate into calcium carbonate, stopping the reaction before the magnesium oxide is attacked by the carbon dioxide, and then treat the mixture of magnesium oxide and calcium carbonate in the manner above described. All of the material resulting from the burning may be ground together and treated with the gas, as the latter does not affect the ground "core" material until after the calcium hydrate has been converted to the carbonate, the entire process thus being simplified by avoiding the necessity of separating the cores from the oxides which cling thereto.

2. Convert the dolomite into magnesium oxide and calcium carbonate by burning the same at a temperature below that at which the calcium carbonate is decomposed (thus converting all of the starting material into "core" material), and then treat the resulting mixture in the manner above described.

3. Convert the dolomite, by prolonged burning, into magnesium oxide and calcium oxide, leaving substantially no "core", i. e. no calcium carbonate, and then treat the resulting mixture in the manner in which the same mixture is treated as stated in (1).

4. In processes (1) and (3) use sodium carbonate instead of carbon dioxide, thus obtaining sodium hydroxide as a by-product.

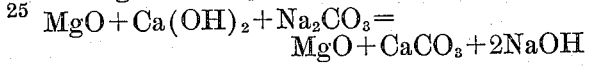

$$MgO+Ca(OH)_2+Na_2CO_3=MgO+CaCO_3+2NaOH$$

Of the above processes I prefer, under ordinary circumstances, the one numbered (2), as this necessitates the use of less fuel.

In all of the methods hereinabove described the magnesium oxide is converted into magnesium sulphate in the presence of calcium carbonate, which latter would be expected to cause serious loss of the acid by reacting therewith to form calcium sulphate. However, I have found, as hereinabove explained, that by adding the acid radical in the form of $SO_2$ gas to a suspension of the mixture of magnesium oxide and calcium carbonate (simultaneously adding oxygen), there is substantially no loss by the formation of calcium sulphate.

My invention is applicable so far as I know to any magnesium limestone, that is, mixture of magnesium carbonate and calcium carbonate. If there are any such limestones to which my process might not be applicable, for instance, because of the presence of some material hostile to the reactions hereinabove described, I do not intend to include them in my claims.

I claim:

1. In the method of separating magnesium and calcium from a mixture of magnesium oxide and calcium carbonate, such as may be obtained by the partial calcining of magnesium limestone, the step which consists in subjecting such mixture to the action of sulphur dioxide and oxygen in the presence of water to form magnesium sulphate, the calcium carbonate remaining substantially unchanged.

2. The method of separating magnesium and calcium from mixtures of the carbonates thereof, such as is found in dolomite, while simultaneously producing magnesium sulphate, which comprises partially calcining the mixture of carbonates so as to convert the magnesium carbonate to oxide while the calcium carbonate remains substantially unchanged, and then subjecting the partially calcined material to the action of sulphur dioxide and oxygen in the presence of water to form magnesium sulphate.

HORACE E. STUMP.